(12) United States Patent
Smith

(10) Patent No.: US 6,264,846 B1
(45) Date of Patent: Jul. 24, 2001

(54) WATER TREATMENT SYSTEM

(76) Inventor: Tony L. Smith, 9353 Harrison Rd., Sedro Woolley, WA (US) 98284

( * ) Notice: Subject to any disclaimer, the term of this patent is extended or adjusted under 35 U.S.C. 154(b) by 0 days.

(21) Appl. No.: 09/470,577

(22) Filed: Dec. 22, 1999

(51) Int. Cl.$^7$ .................................................. C02F 1/00
(52) U.S. Cl. ........................................ 210/749; 210/198.1
(58) Field of Search ................................. 210/749, 198.1

(56) References Cited

U.S. PATENT DOCUMENTS

| | | | |
|---|---|---|---|
| 4,339,332 | * | 7/1982 | Jasperson . |
| 4,640,782 | * | 2/1987 | Burleson . |
| 5,350,512 | * | 9/1994 | Tang . |
| 5,447,641 | * | 9/1995 | Wittig . |
| 5,746,923 | * | 5/1998 | Forward . |
| 6,096,221 | * | 8/2000 | Kerchouche et al. . |
| 6,129,850 | * | 10/2000 | Martin et al. . |

* cited by examiner

Primary Examiner—David A. Simmons
Assistant Examiner—Betsey Morrison Hoey
(74) Attorney, Agent, or Firm—Michael R. Schacht; Hughes & Schacht, PLLC

(57) ABSTRACT

A system for processing water by mixing the water with an additive. The system comprises a source of unprocessed water; a destination of processed water; a source of the additive; structure defining a main passageway, a bypass passageway, and an injection passageway. The bypass passageway is in fluid communication with the main passageway at first and second locations. The injection passageway is in fluid communication with an injection portion of the bypass passageway. The injection portion of the bypass passageway is configured such that the flow of unprocessed water through the bypass passageway causes additive to flow through the injection passageway and into the bypass passageway. The system may further comprise optional structure for creating a differential pressure between an inlet portion of the main passageway and a mixing portion of the main passageway.

24 Claims, 7 Drawing Sheets

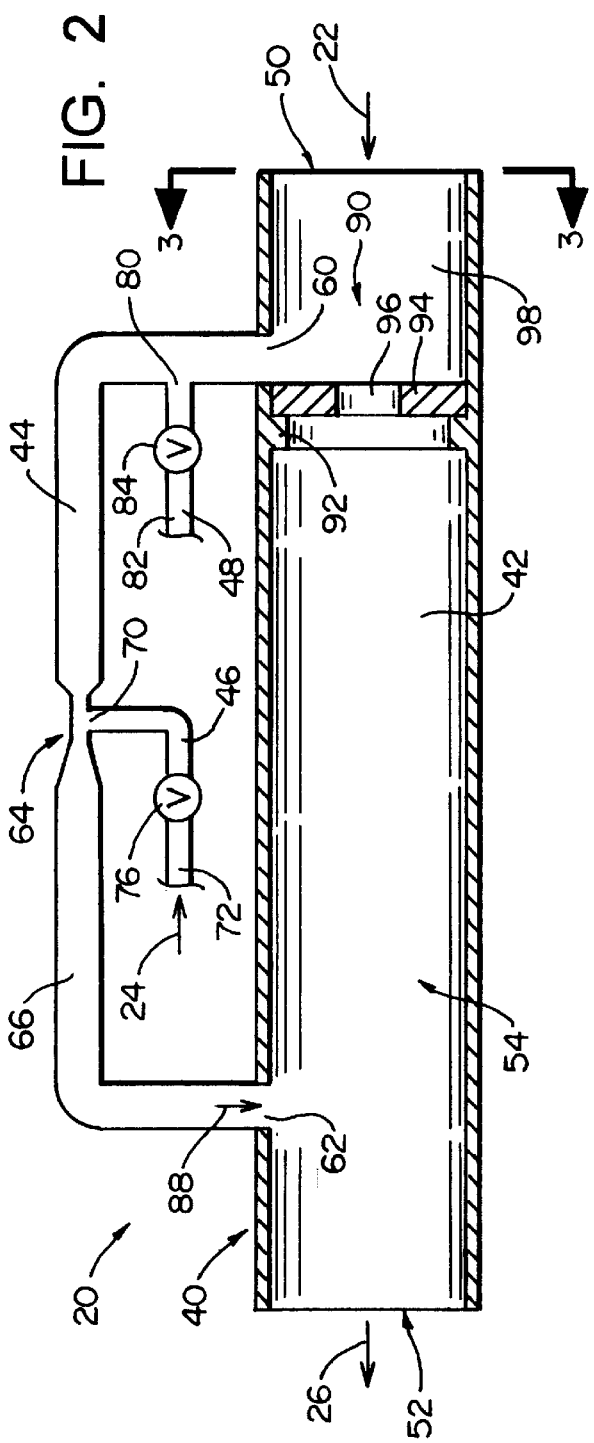
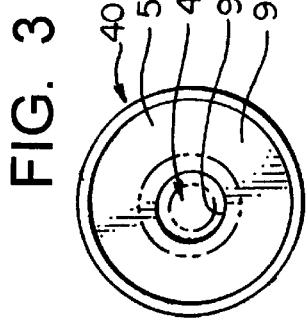
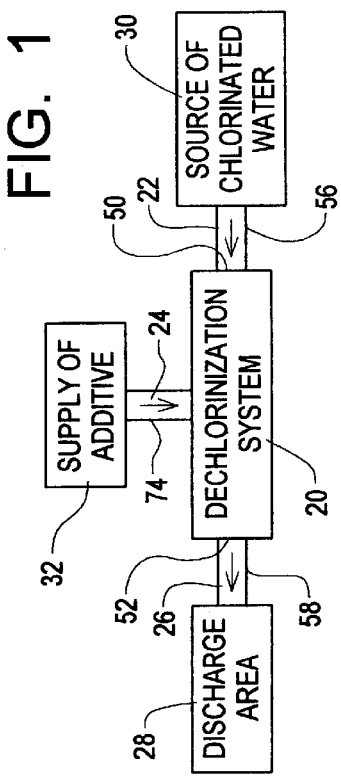

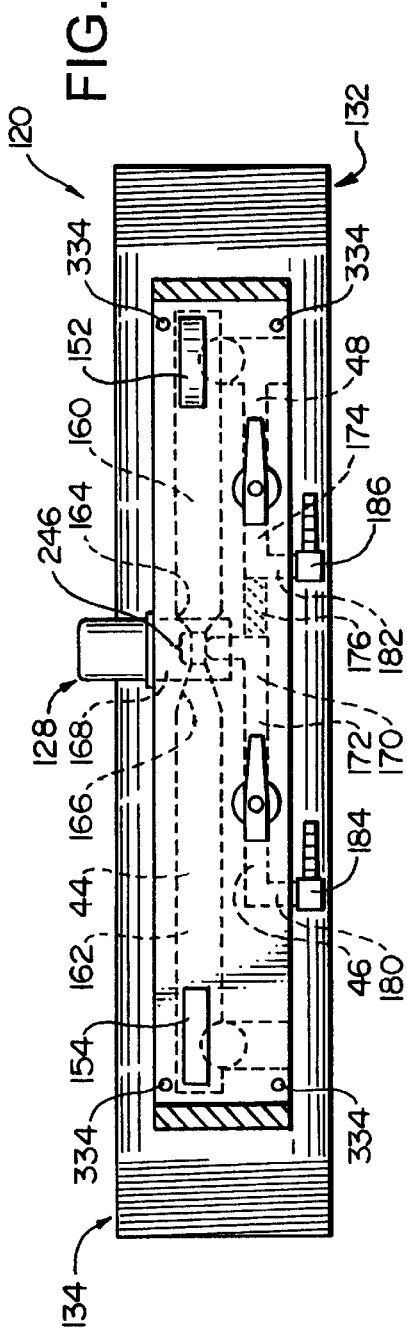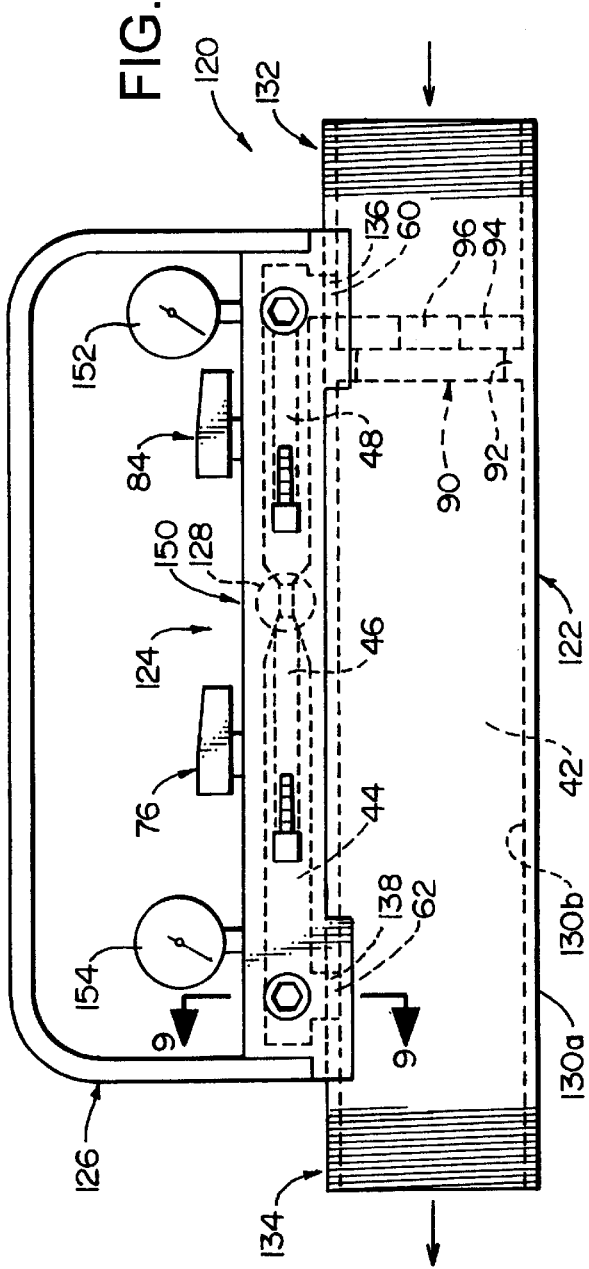

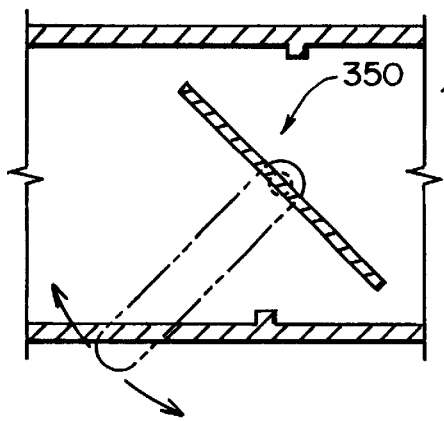
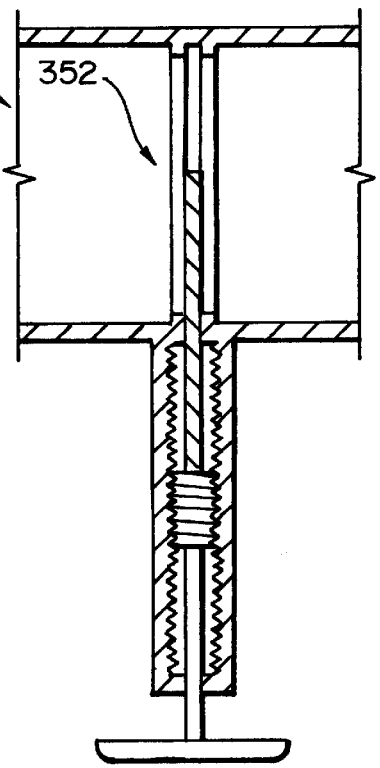
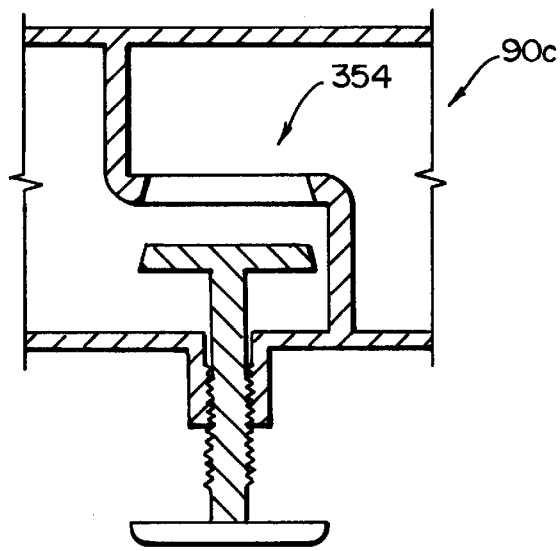
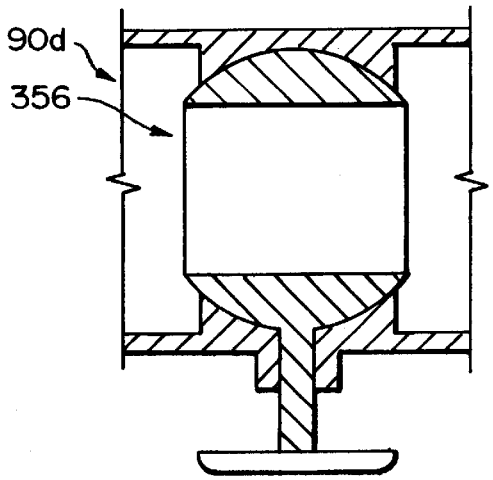

WATER TREATMENT SYSTEM

FIELD OF THE INVENTION

The present invention relates to the treatment of water that is discharged into the environment and, more specifically, to the processing of water such as the removal of chlorine and chloramines from water discharged from water lines during flushing, initial disinfecting, testing, and the like.

BACKGROUND OF THE INVENTION

Treated water is often discharged from utility water systems during flushing, testing, and the like. Utility water is often treated for human consumption with chemicals such as chlorine.

Traditionally, chlorinated water was simply discharged into the surrounding environment. More recently, it has been recognized that chlorinated water may be disruptive to the ecology of the environment into which it is discharged. Accordingly, attempts have been made to treat the utility water before it is discharged into the environment to prevent ecological disruption.

The present invention relates to systems and methods of treating chlorinated utility water discharged into the surrounding environment such that the water does not disrupt the ecology of the surrounding environment.

SUMMARY OF THE INVENTION

The present invention is a system for processing water by mixing the water with an additive comprising a source of unprocessed water; a destination of processed water; a source of the additive; and structure defining a main passageway, a bypass passageway, and an injection passageway. The bypass passageway is in fluid communication with the main passageway at first and second locations. The injection passageway is in fluid communication with an injection portion of the bypass passageway. The injection portion of the bypass passageway is configured such that the flow of unprocessed water through the bypass passageway causes additive to flow through the injection passageway and into the bypass passageway. The additive is, in one preferred embodiment, a neutralizing reagent for chemicals such as chlorine in the unprocessed water.

The system may further comprise optional structure for creating a differential pressure between an inlet portion of the main passageway and a mixing portion of the main passageway. This structure may comprise a plurality of discs each defining a through hole of a different cross-sectional area. This structure for creating this differential pressure may alternately comprise a valve assembly such as a butterfly valve, a gate valve, a universal valve, and a ball valve.

Preferably, the injection portion of the bypass passageway has a reducing cross-sectional area portion and an increasing cross-sectional area portion. The additive enters the bypass passageway from the injection passageway at an injection location substantially between the reducing cross-sectional area portion and the increasing cross-sectional area portion.

Optionally, a tap passageway that allows fluid communication between the bypass passageway and a tap port may be provided for obtaining fresh water on site.

The present invention may also be embodied as a method of mixing the water with an additive. This method preferably comprises the steps of establishing fluid communication between a bypass passageway and a main passageway at first and second locations and between the injection passageway and an injection portion of the bypass passageway. The main passageway is connected to a source of unprocessed water and to a destination of processed water. The injection passageway is connected to the source of the additive. The injection portion of the bypass passageway is configured such that the flow of unprocessed water through the bypass passageway causes additive to flow through the injection passageway and into the bypass passageway.

BRIEF DESCRIPTION OF THE DRAWING

FIG. 1 is a schematic block diagram depicting the use of a water processing system constructed in accordance with, and embodying, the principles of the present invention;

FIG. 2 is a partial schematic/partial section view of the water processing system of FIG. 1;

FIG. 3 is a partial end elevation view of an orifice restricting structure taken along lines 3—3 in FIG. 2;

FIG. 4 is a top plan view of an exemplary water processing system of the present invention;

FIG. 5 is a side elevation view of the dechlorinization system depicted in FIG. 4;

FIGS. 10–13 depict alternate orifice restricting structures that may be substituted for the orifice restricting structure depicted in FIGS. 2–4.

DETAILED DESCRIPTION OF THE PREFERRED EMBODIMENTS

Figure 6:
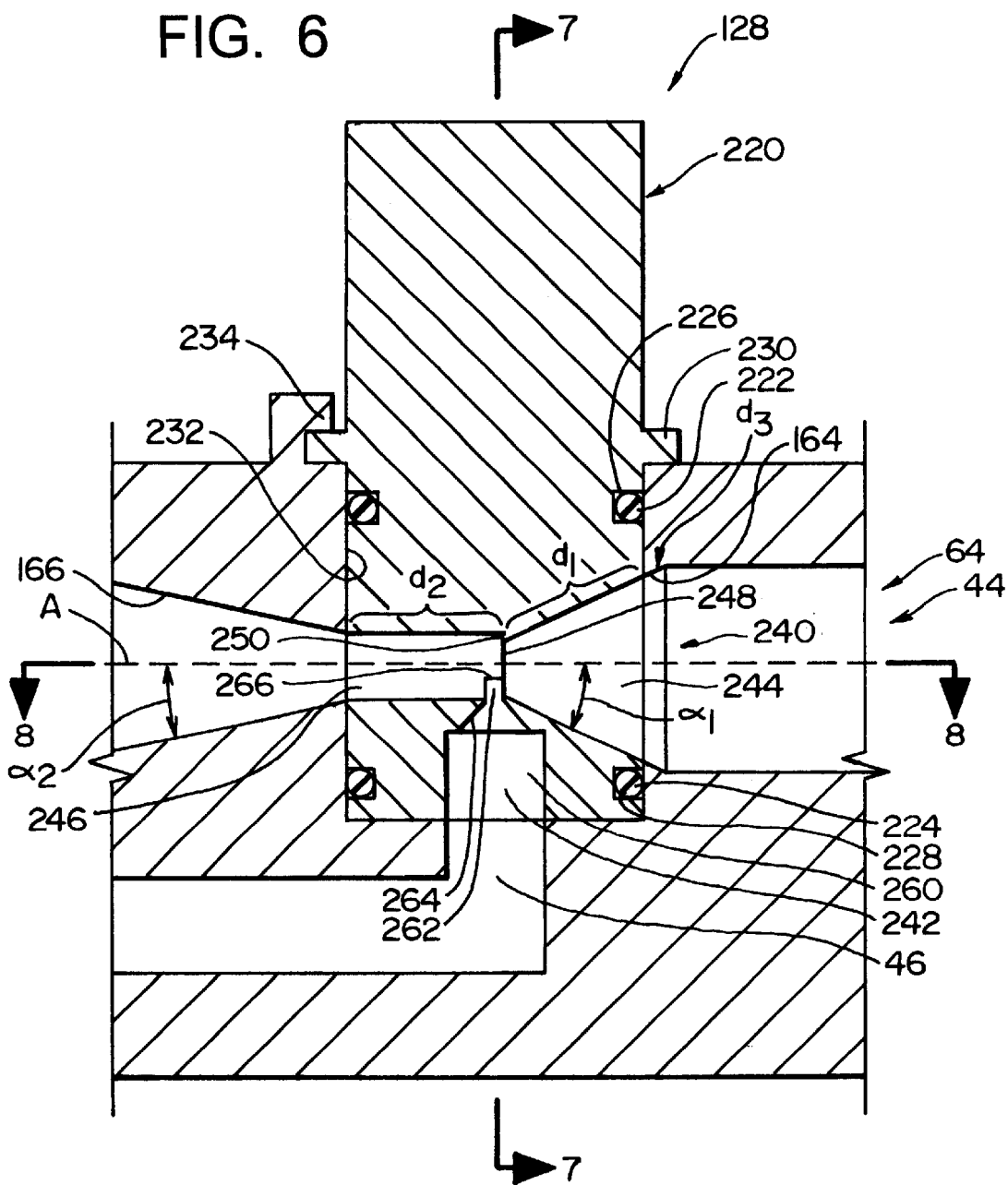
FIG. 6 is an enlarged section view of an injection chamber that forms a part of the water processing system of FIGS. 4 and 5.

Referring initially to FIG. 1, depicted at 20 therein is a water processing system that mixes unprocessed water 22 with additive concentrate 24 to obtain processed water 26 that is discharged into a discharge area 28.

The discharge area 28 typically is not contained and thus any water introduced therein will eventually flow into rivers, streams, or the like and/or will seep into the groundwater.

The unprocessed water 22 is obtained from a water source 30. The water source 30 is typically a utility supply line or the like that contains water that has been treated with chlorine for disinfection and/or human consumption. The characteristics of the water source 30 and the unprocessed water 22 obtained therefrom can vary significantly depending upon the characteristics of the utility system and the location of the connection to the utility system.

The characteristics of the water source 30 and unprocessed water 22 that are most relevant to the preferred embodiment of the water processing system 20 include flow rate and chlorine content.

The additive concentrate 24 is obtained from a reagent supply 32. The concentrate 24 contains a material that, when mixed with unprocessed water 22, reacts with and neutralizes the chlorine. Appropriate reagents for use in the additive concentrate 24 may include one or more of the following: sulfur dioxide, sodium bisulfite, sodium sulfite, sodium thiosulfate, and ascorbic acid.

The reagent supply 32 comprises a container such as a bucket or the like capable of containing the additive concentrate 24. Typically, the additive concentrate 24 is obtained by mixing a dry reagent material with water to obtain a liquid having a known concentration of reagent.

Referring now to FIG. 2, the exemplary water processing system 20 will now be described in further detail. The water processing system 20 comprises a structure 40 defining a main passageway 42, a bypass passageway 44, an injection passageway 46, and a tap passageway 48. In the following discussion, the terms "upstream" and "downstream" are in reference to the direction of fluid flow through a given passageway during normal use. In addition, the terms "inlet" and "outlet" refer to openings in which, under normal use, fluid enters and exits, respectively, a given passageway.

The main passageway 42 defines a main inlet opening 50, a main outlet opening 52, and a mixing portion 54. As shown in FIG. 1, the main inlet opening 50 is operatively connected by an inlet hose 56 to the water source 30, while the main outlet opening 52 is operatively connected to an outlet hose 58 that discharges the processed water 26 into the discharge area 28. Any conventional fitting may be used to connect the main inlet and outlet openings 50 and 52 to the hoses 56 and 58 as appropriate for the source 30 of unprocessed water 22.

Referring again to FIG. 2, the bypass passageway 44 is in fluid communication with the main passageway 42 through a bypass inlet opening 60 and a bypass outlet opening 62. The bypass passageway 44 further comprises an injection portion 64 spaced between the bypass inlet opening 60 and the bypass outlet opening 62 and a premix portion 66 downstream of the injection portion 64.

During normal operation, a portion of any fluid travelling through the main passageway 42 enters the bypass passageway 44 through the bypass inlet opening 60, flows through the injection portion 64 of the bypass passageway 44, and then enters the mixing portion 54 of the main passageway 42 through the bypass outlet opening 62.

FIG. 2 also shows that the injection passageway 46 defines an injection outlet opening 70 and an injection inlet opening 72. The injection passageway 46 is in fluid communication with the injection portion 64 of the bypass passageway 44 through the injection outlet opening 70. The injection inlet opening 72 is operatively connected to the supply 32 of additive concentrate 24 through an injection hose 74. An injection valve assembly 76 is arranged in the bypass passageway 44 to allow the flow of fluid through this passageway 44 to be controlled. As will be described below, the additive concentrate 24 will flow into the injection portion 64 of the bypass passageway 44 under normal operation of the system 20.

The tap passageway 48 is in fluid communication with the bypass passageway 44 through a tap inlet opening 80. A portion of any fluid flowing through the bypass passageway 44 will thus flow through the tap passageway 48 to a tap outlet opening 82. A tap valve assembly 84 allows control of the flow of fluid through the tap passageway 48.

As will be described in detail below, the geometry of the injection portion 64 of the bypass passageway 44 is such that flow of the unprocessed water 22 through the bypass passageway draws the additive concentrate 24 from the reagent supply 32 through the injection hose 74 and injection passageway 46 and into the bypass passageway 44. As the unprocessed water 22 and additive concentrate 24 flow through the premix portion 66 of the bypass passageway 44, the additive concentrate 24 is premixed with the unprocessed water 22 to obtain a reagent dilution 88. The reagent dilution 88 flows into the mixing portion 54 of the main passageway 42. The tap passageway 48 and the tap valve 84 associated therewith are provided primarily to provide a controlled source of water on site that may be used to form the additive concentrate 24.

In the mixing portion 54 of the main passageway 42 (and in the outlet hose 58 downstream thereof), the reagent dilution 88 mixes with the unprocessed water 22 to obtain the processed water 26. If the concentration of reagent in the additive concentrate 24 is appropriate for the flow rate and chlorine concentration of the unprocessed water 22, the processed water 26 may be discharged into the discharge area 28 without harming the ecology of this area 28.

Referring now for a moment back to FIG. 2, shown at 90 therein is a flow restriction system that may be incorporated into the water processing system 20. The exemplary flow restriction system 90 comprises an annular projection 92 that extends into the main passageway 42 and a plurality of restriction discs 94. The annular projection 92 is arranged in the main passageway 42 between the bypass inlet opening 60 and bypass outlet opening 62.

The system 20 may be used without any of the restriction discs 94 or, as shown in FIG. 2, with one of the restriction discs 94 disposed within the main passageway 42. The restriction discs 94 are rigid members having an opening 96 formed therein. The annular projection 92 engages the restriction discs 94 in the main passageway 42 to maintain these discs at a desired location within the main passageway 42 such that fluid flowing through the main passageway 42 must flow through the opening 96 in the disc 94. This desired position is located between the bypass inlet and outlet openings 60 and 62.

When the system 20 is operated without a restriction disc, fluid flows from the main inlet opening 50 to the main outlet opening 52 substantially unhindered. When one of the restriction discs 94 is used, the flow of fluid from the main inlet opening 50 to the main outlet opening 52 is restricted. The restriction discs 94 thus create a differential pressure between an inlet portion 98 of the main passageway 42 upstream of the restriction disc 94 and the mixing portion 54 of the main passageway 42, which is located downstream of the of the restriction disc 94.

Each disc 94 will have an opening 96 of a different cross-sectional area. The smaller the cross-sectional area of the openings 96, the larger the differential pressure between the inlet and mixing portions 98 and 54 of the main passageway 42. In certain situations, a differential pressure as created by the restriction disc 94 may be necessary to control the flow of unprocessed water 22 and thereby ensure a proper proportion of the additive concentrate 24 is mixed with the unprocessed water 22. These discs 94, in conjunction with the bypass passageway 44, allows the system 20 to accommodate a wide range of flow rates of the unprocessed water 22 with minimal head losses through the system 20.

Referring now to FIGS. 4 and 5, depicted therein at 120 is an exemplary processing assembly that may be used as the structure 40 described above.

The processing assembly 120 defines the main, bypass, injection, and tap passageways 42, 44, 46, and 48 as described above. The reference characters used above to identify the features of these passageways 42, 44, 46, and 48 will be used in the discussion of the processing assembly 120 below.

The processing assembly 120 comprises a main body 122, a bypass assembly 124, a handle 126, and an injector plug assembly 128.

The exemplary main body 122 is a hollow member having an inner wall surface 130a and an outer wall surface 130b. The inner wall surface 130b defines the main passageway 42.

Preferably, the main body 122 is a short length of cylindrical pipe having threaded outer wall surface portions 132 and 134 to facilitate connection of the body 122 to the inlet and outlet hoses 56 and 58 through conventional coupling assemblies. Through holes 136 and 138 are formed in the main body 122 to form the bypass inlet and outlet openings 60 and 62, respectively. The restriction projection 92 of the restriction system 90 extends radially inwardly from the inner wall surface 130a between the through holes 136 and 138.

The bypass assembly 124 basically comprises a bypass body 150, the injection and tap valve assemblies 76 and 84 described above, an inlet gauge 152, and, optionally, an outlet gauge 154.

The bypass body 150 is a solid metal piece milled to define the bypass, injection, and tap passageways 44, 46, and 48.

The bypass passageway 44 is partly formed by first and second colinear end bores 160 and 162. These end bores 160 and 162 are formed by drilling in opposite directions into the body 150. The bits used to form these bores 160 and 162 are shaped to obtain frustoconical end walls 164 and 166.

A plug bore 168 is also formed in the bypass body 150; the plug bore 168 intersects the end walls 164 and 166 of the end bores 160 and 162. The injector plug assembly 128 is inserted into the plug bore 168 to define portions of the bypass passageway 44 and the injector passageway 46 as will be described in further detail below.

The injection and tap passageways 46 and 48 are partly formed by a side bore 170 formed in the bypass body 150 parallel to the end bores 160 and 162. The side bore 170 is separated into injection and tap portions 172 and 174 by an intermediate plug 176. Injection and tap cross bores 180 and 182 are formed in the body 150 to intersect with the side bore 170 and complete the injection and tap passageways 46 and 48.

Injection and tap ports 184 and 186 are fitted into the injection and tap cross bores 180 and 182 to define the injection inlet opening 72 and tap outlet opening 82, respectively. The ports 184 and 186 are conventional fittings sized and dimensioned to allow hose such as the injection hose 74 be connected to the injection and tap passageways 46 and 48.

Figure 7:
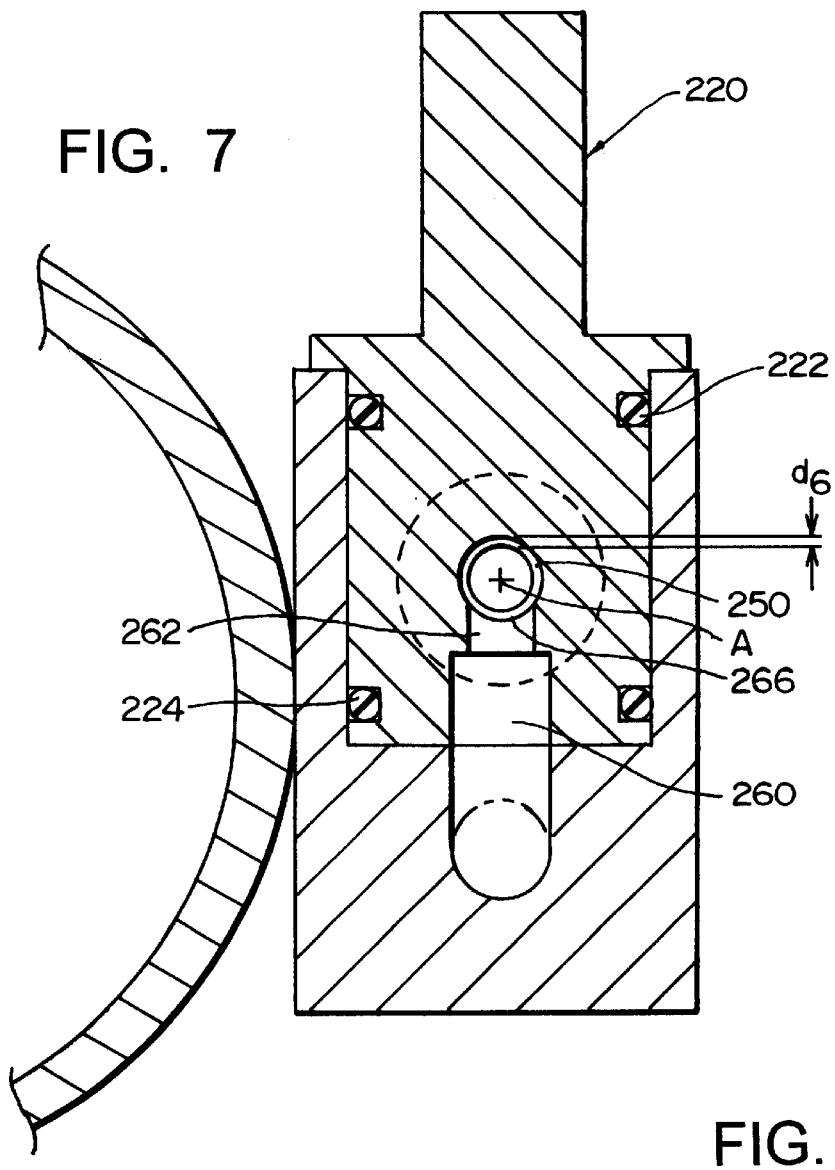
FIG. 7 is a partial section view taken along lines 7—7 of FIG. 6.
Figure 8:
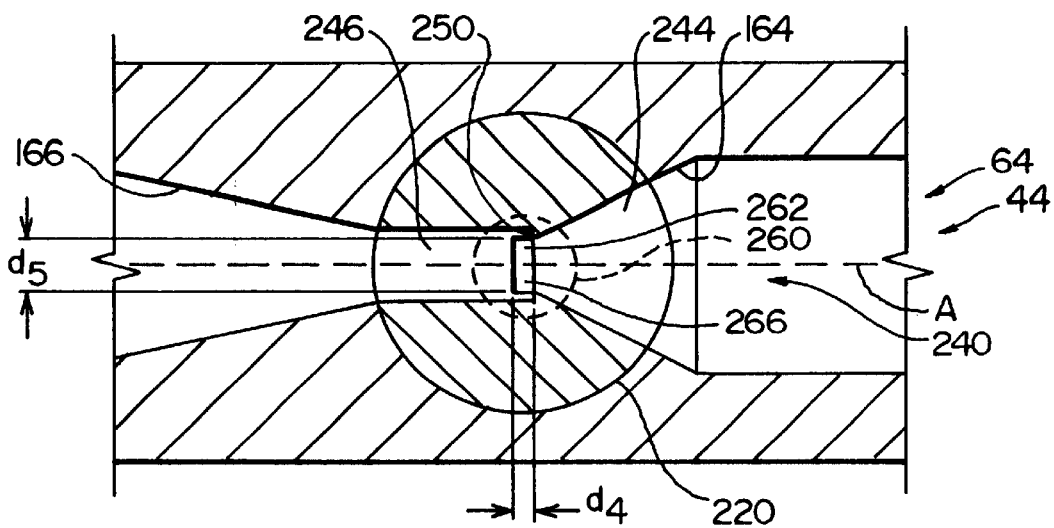
FIG. 8 is a section view taken along lines 8—8 in FIG. 6.

Referring now to FIGS. 6–8, the injection portion 64 of the bypass passageway 44 and injection plug assembly 128 will be described in further detail. Referring initially to FIG. 6, it can be seen that the injection plug assembly 128 comprises a plug body 220 and first and second plug O-rings 222 and 224.

The plug body 220 is generally cylindrical but defines first and second plug ring grooves 226 and 228 and comprises a locking projection 230. A portion of the plug O-rings 222 and 224 resides in the ring grooves 226 and 228. During use, the plug body 220 is snugly received within a plug cavity 232 formed in the bypass body 124. A retaining projection 234 is formed on the bypass body 124. Inserting the plug body 220 into the plug cavity 232 and axially rotating the plug body about its longitudinal axis causes the locking projection 230 to engage the retaining projection 234.

When the plug body 220 is properly oriented relative to the bypass body 124, the retainer projection 234 engages the locking projection 230 to prevent further axial rotation of the plug body 220 or movement of the plug body 220 along its longitudinal axis relative to the bypass body 124. When the plug body 220 is locked in its proper position relative to the bypass body 124, the O-rings 222 and 224 seal the juncture between the plug body 220 and the bypass body 124.

The plug body 128 defines a through passageway 240 and a side passageway 242. When the plug body 220 is locked onto the bypass body 124, the through passageway 240 forms a part of the injection portion 64 of the bypass passageway 44 and the side passageway 242 forms a part of the injection passageway 46.

The through passageway 240 comprises a frustoconical portion 244 and a cylindrical portion 246. The frustoconical and cylindrical portions 244 and 246 meet at a reduced diameter end 248 of the frustoconical portion 244. In addition, the radius of the cylindrical portion 246 is slightly larger than the radius of the frustoconical portion 244 at its reduced diameter end 148 such that an annular lip 250 is formed at the juncture of the frustoconical and cylindrical portions 244 and 246. The lip 250 is generally orthogonal to the direction of the flow of fluid through the injection passageway 46 in the injection portion 64 thereof.

The through passageway 240 further defines a center axis A. The frustoconical and cylindrical portions 244 and 246 of the passageway 240 are aligned along the center axis A, as are the frustoconical end walls 164 and 166 of the bypass body 124 described above. In addition, the end walls 164 and 166 and portions 244 and 246 of the through passageway 240 are sized and dimensioned such that injection portion 64 of the bypass passageway 46 is continuous where the plug body 220 meets the bypass body 124 as shown in FIGS. 6 and 8.

As perhaps best shown in FIG. 8, the side passageway 242 comprises a cylindrical portion 260 and a rectangular portion 262 connected by a generally frustoconical portion 264. The cross-sectional area of the cylindrical portion 260 is larger than that of the rectangular portion 262. The rectangular portion 262 meets with the cylindrical portion 246 of the through passageway 240 to form an elongate, arcuate slit 266 through which the fluid is drawn as it enters the injection portion 64 of the bypass passageway 46.

The slit 266 is arranged to introduce fluid into the injection portion 64 downstream of the annular lip 250. The rectangular portion 262 is arranged such that fluid passing through the injection passageway 46 is enters the bypass passageway 44 at substantially a right angle to the flow of fluid into the bypass passageway 44.

The geometry of the injection portion 64 of the bypass passageway 46 as just described creates a low or vacuum pressure area in the cylindrical portion 246 of the through passageway 240. In particular, the injection portion 64 of the bypass passageway 46 comprises a decreasing cross-sectional area portion, a constant cross-sectional area portion, and an increasing cross-sectional area portion. The low pressure created by this geometry effectively draws additive concentrate 24 from the supply 32 thereof into the bypass passageway 46. This geometry thus creates, in effect, a venturi eductor. The injection valve assembly 76 controls the amount of the additive concentrate 24 that is drawn into the bypass passageway 46.

The table below sets forth the preferred values of certain parameters, and first and second acceptable ranges of these values, describing the geometry of the injection portion 64 of the bypass passageway 46; these parameters are identified in FIG. 16. All angles are measured with reference to the longitudinal axis A described above:

TABLE A

| Dimension | Preferred Value | First Preferred Range | Second Preferred Range |
| --- | --- | --- | --- |
| $\alpha_1$ | 25° | 25° ± 10% | 25° ± 15% |
| $\alpha_2$ | 5° | 5° ± 10% | 5° ± 15% |
| $l_1$ | 2.75" | 2.75" ± 10% | 2.75" ± 15% |
| $l_2$ | 0.36" | 0.36" ± 10% | 0.36" ± 15% |
| $l_3$ | 0.50" | 0.50" ± 10% | 0.50" ± 15% |
| $d_1$ | 0.265" | 0.265" ± 10% | 0.265" ± 15% |
| $d_2$ | 0.750" | 0.750" ± 10% | 0.750" ± 15% |
| $d_3$ | 0.250" | 0.250" ± 10% | 0.250" ± 15% |
| $d_4$ | 0.750" | 0.750" ± 10% | 0.750" ± 5% [001b] |
| $t_1$ | 0.0075" | 0.0075" ± 10% | 0.0075" ± 15% |
| $t_2$ | 0.031" | 0.031" ± 10% | 0.031" ± 15% |

The numbers provided above are optimized for a cylindrical main passageway having a diameter of approximately three inches. A main passageway of a different cross-sectional area may be employed, in which case the values of the various parameters described above should be scaled up or down accordingly. The preferred embodiment described herein is thus preferred only in the general proportions or ratios inherent in the geometry described in Table A. In the event that the system 20 described herein is to be scaled up or down, certain ratios should be maintained to provide proper operation of the larger or smaller scale system.

In particular, the ratios of $l_1$ to $l_2$, $l_1$ to $l_3$, and $d_1$ to $d_2$ are preferably approximately the same as those of the preferred embodiment described above. More broadly, the ratios of the values defining a system implementing the principles of the present invention are preferably within a first preferred range of plus or minus ten percent from the ratios inherent in Table A, but in any event should be within a second preferred range of plus or minus twenty percent from the ratios inherent in Table A.

Figure 9:
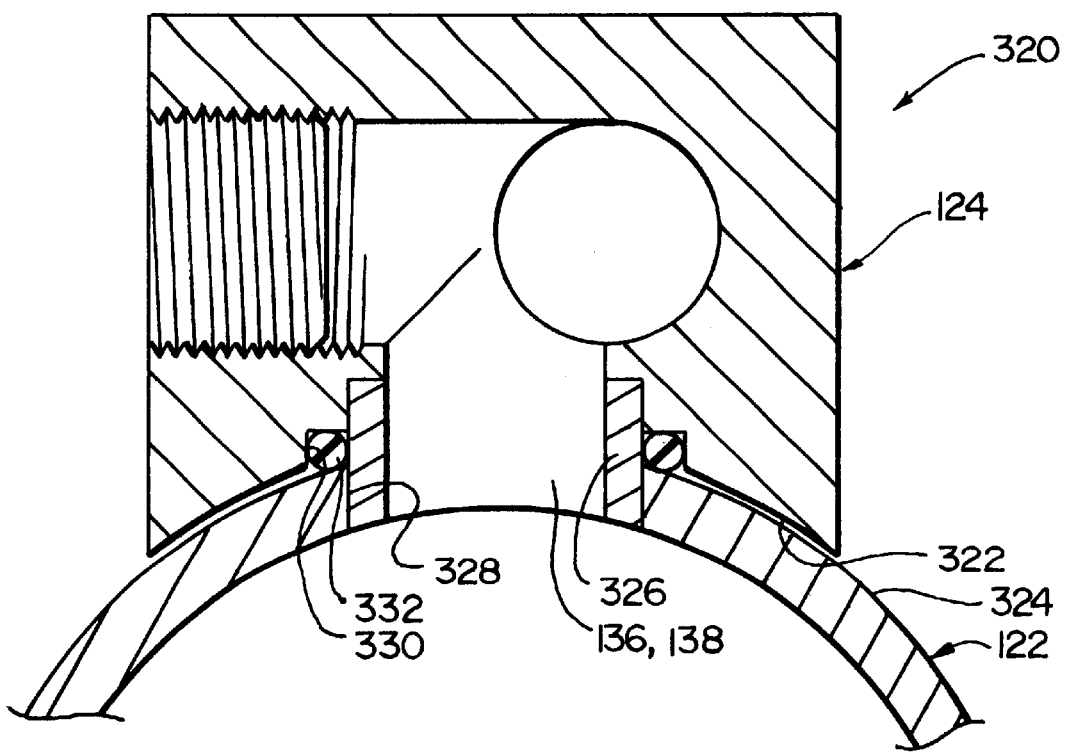
FIG. 9 is an enlarged section view of a system for securely connecting and sealing an injection assembly and a main body of the decholinization system of FIGS. 4 and 5.
Figure 14:
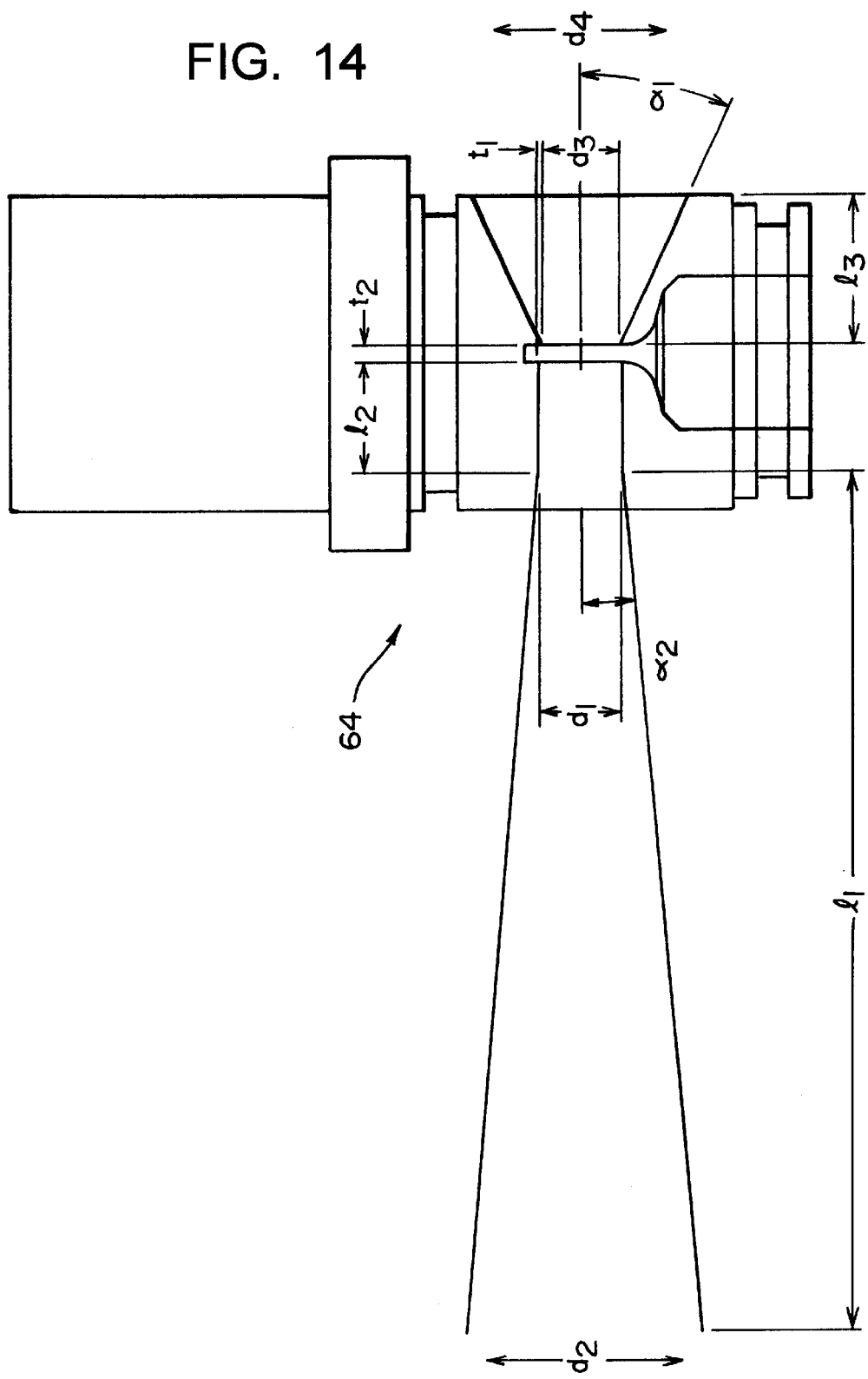
FIG. 14 is a highly schematic diagram depicting certain parameters describing the geometry of an injection portion of the bypass passageway of the system of FIG. 1.

Referring now to FIG. 9, depicted therein is a sealing system 320 that forms a seal between the main body 122 and the bypass body 124. Two such sealing systems are employed by the system 20, one adjacent to the inlet 60 of the bypass passageway 44 and one adjacent to the outlet 62 of the bypass passageway 44. The two sealing systems used by the system 20 are identical, and the following discussion applies to either of these systems.

As shown in FIG. 9, a lower surface 322 of the bypass body 124 is curved to conform to an outer surface 324 of the generally cylindrical main body 122. Extending from the lower surface 322 of the bypass body 124 is a cylindrical member 326 that is press fit into a bore 328 in the bypass body 124. An annular seal groove 330 is formed in the bypass body 124 around the bore 328. An O-ring 332 is placed into the seal groove 330.

When the bypass body 124 is mounted on the main body 122, the cylindrical member 326 extends into the through holes 136, 138 in the main body 122. The O-ring 332 is snugly held between the main body 122 and the bypass body 124 to form a seal around the through holes 136, 138.

Referring for a moment to FIGS. 4 and 5, it can be seen that four fasteners 334 are employed to fasten the bypass body 124 onto the main body 122. These fasteners 334 ensure that the O-ring 332 forms an appropriate seal between the main body 122 and the bypass body 124.

Turning now to FIGS. 10–13, depicted therein are alternate flow restricting systems 90a, 90b, 90c, and 90d that may be used in place of the exemplary flow restricting system 90 described above. All of these systems allow the flow of fluid through the main passageway 42 to be controlled to establish a desired differential pressure between the mixing and the inlet portions 54 and 98 of the main passageway 42.

The system 90a in FIG. 10 employs a butterfly valve assembly 350. The system 90b in FIG. 11 employs a gate valve assembly 352. The system 90c in FIG. 12 employs a universe valve assembly 354. The system 90d in FIG. 13 employs a ball valve assembly 356. These valve assemblies 350–356 are conventional and all work by rotating, sliding, or displacing a member relative to an opening to change an effective cross-sectional area of the main passageway 42. By reducing the effective cross-sectional area of the main passageway 42, the flow of fluid through the main passageway 42 is restricted. Flow restricting systems other than the systems 90, 90a, 90b, 90c, and 90d may be used to restrict flow through the main passageway 42.

In the preferred embodiment, a cylindrical injection plug assembly 128 was detachably attached to the bypass body 150. A cylindrical injection plug assembly as described above simplifies certain manufacturing aspects of the exemplary system 20, but other configurations are possible. For example, a block in a shape other than cylindrical, such as a rectangular solid, may be used instead, with the entire injection portion 64 of the bypass passageway 44 being defined by this block. Both such a removable block or the exemplary cylindrical body 150 described above may be removed to allow debris that may flow into and lodge in the constricted injection portion 64 of the bypass passageway 44 to be easily removed.

From the foregoing, it should be clear that the present invention may be embodied in forms other than those described above.

I claim:

1. A system for dechlorinating potable water by mixing chlorinated water with an additive including ascorbic acid, comprising:

a source of chlorinated water;

a destination of dechlorinated water;

a source of the additive;

structure defining a main passageway, a bypass passageway, and an injection passageway, where the bypass passageway is in fluid communication with the main passageway at first and second locations and the injection passageway is in fluid communication with an injection portion of the bypass passageway;

a first structure for connecting the source of chlorinated water to the main passageway;

a second structure for connecting the main passageway to the destination of dechlorinated water;

a third structure for connecting the source of the additive to the injection passageway; wherein the injection portion of the bypass passageway is configured such that the flow of chlorinated water through the bypass passageway causes the additive to flow through the injection passageway, flow into the bypass passageway, and mix with the chlorinated water to form dechlorinated water that flows to the destination of dechlorinated water.

2. A system as recited in claim 1, further comprising structure for creating a differential pressure between an inlet portion of the main passageway and a mixing portion of the main passageway.

3. A system as recited in claim 2, in which the structure for creating a differential pressure between the inlet and mixing portions of the main passageway comprises a plurality of discs each defining a through hole of a different cross-sectional area.

4. A system as recited in claim 2, in which the structure for creating a differential pressure between the inlet and mixing portions of the main passageway comprises a valve assembly.

5. A system as recited in claim 4, in which the valve assembly comprises at least one valve assembly selected from the group of valve assemblies consisting of a butterfly valve, a gate valve, a universal valve, and a ball valve.

6. A system as recited in claim 1, in which the bypass passageway comprises a bypass inlet and a bypass outlet, where the bypass inlet is in fluid communication with the inlet portion of the main passageway and the bypass outlet is in fluid communication with a mixing portion of the main passageway.

7. A system as recited in claim 1, in which the injection portion of the bypass passageway has a reducing cross-sectional area portion and an increasing cross-sectional area portion, where additive enters the bypass passageway from the injection passageway at an injection location substantially between the reducing cross-sectional area portion and the increasing cross-sectional area portion.

8. A system as recited in claim 7, in which an annular lip is formed between the reducing cross-sectional portion and the increasing cross-sectional portion of the bypass passageway, where the injection location is downstream of the annular lip.

9. A system as recited in claim 8, in which the bypass passageway further has a constant cross-sectional area portion arranged between the annular lip and the increasing cross-sectional area portion.

10. A system as recited in claim 1, further comprising a tap passageway that allows fluid communication between the bypass passageway and a tap port.

11. A method of continuously dechlorinating potable water with an additive including ascorbic acid, comprising:
 defining a main passageway, a bypass passageway, and an injection passageway;
 allowing fluid communication between the bypass passageway and the main passageway at first and second locations;
 allowing fluid communication between the injection passageway and an injection portion of the bypass passageway;
 connecting the main passageway to a source of chlorinated potable water;
 connecting the main passageway to a destination of dechlorinated water;
 connecting the injection passageway to the source of the additive; and
 configuring the injection portion of the bypass passageway such that the flow of chlorinated water through the bypass passageway causes additive to flow through the injection passageway and into the bypass passageway to mix the additive with the chlorinated water to obtain dechlorinated water that flows to the destination of dechlorinated water.

12. A method as recited in claim 11, further comprising the step of creating a desired differential pressure between an inlet portion of the main passageway and a mixing portion of the main passageway.

13. A method as recited in claim 12, further in which the step of creating the desired differential pressure comprises the steps of:
 providing a plurality of discs each defining a through hole of a different cross-sectional area;
 selecting one of the plurality of discs based on the desired differential pressure; and
 arranging the selected one of the plurality of discs within the main passageway to create the desired differential pressure.

14. A method as recited in claim 12, further in which the step of creating the desired differential pressure comprises the steps of:
 arranging a valve assembly within the main passageway; and
 operating the valve assembly to create the desired differential pressure.

15. A method as recited in claim 11, further comprising the step of forming the injection portion of the bypass passageway such that the injection portion has a reducing cross-sectional area portion and an increasing cross-sectional area portion, where additive enters the bypass passageway from the injection passageway at an injection location substantially between the reducing cross-sectional area portion and the increasing cross-sectional area portion.

16. A method as recited in claim 15, further comprising the step of forming an annular lip upstream of the injection location between the reducing cross-sectional portion and the increasing cross-sectional portion of the bypass passageway.

17. A method as recited in claim 16, further comprising the step of arranging a constant cross-sectional area portion of the injection portion of the bypass passageway between the annular lip and the increasing cross-sectional area portion.

18. A method as recited in claim 11, further comprising the step of arranging a tap passageway to allow fluid communication between the main passageway and a tap port.

19. An assembly for dechlorinating water from a source of chlorinated water by mixing an additive with the chlorinated water to obtain dechlorinated water that may be discharged in a discharge area, comprising:
 a main body defining a main passageway having an inlet portion and a mixing portion;
 a bypass body defining a bypass passageway and an injection passageway, where the injection passageway is in fluid communication with an injection portion of the bypass passageway;
 connecting means for connecting the bypass body and the main body together such that the bypass passageway is in fluid communication with the main passageway at the inlet portion and the mixing portion of the main passageway;
 flow restricting means mounted in the main passageway for creating a differential pressure between the inlet portion and the mixing portion of the main passageway; and
 a plug member detachably attached to the bypass body, where, when attached to the bypass body, the plug member defines at least a portion of the injection portion of the bypass passageway; wherein
 the injection portion of the bypass passageway is configured such that the flow of chlorinated water through the bypass passageway causes additive to flow through the injection passageway, into the bypass passageway, and into the mixing portion of the main passageway to mix the additive with the chlorinated water to obtain the dechlorinated water.

20. A system as recited in claim 19, in which the injection portion of the bypass passageway has a reducing cross-sectional area portion and an increasing cross-sectional area portion, where additive enters the bypass passageway from the injection passageway at an injection location substantially between the reducing cross-sectional area portion and the increasing cross-sectional area portion.

21. A system for processing water by mixing the water with an additive, comprising:

a source of unprocessed water;

a destination of processed water;

a source of the additive;

structure defining a main passageway, a bypass passageway, and an injection passageway, where the bypass passageway is in fluid communication with the main passageway at first and second locations and the injection passageway is in fluid communication with an injection portion of the bypass passageway;

a first structure for connecting the source of unprocessed water to the main passageway;

a second structure for connecting the main passageway to the destination of processed water;

a third structure for connecting the source of the additive to the injection passageway; and a plug member detachably attached to the bypass body, where, when attached to the bypass body, the plug member defines at least a portion of the injection portion of the bypass passageway; wherein the injection portion of the bypass passageway is configured such that the flow of unprocessed water through the bypass passageway causes additive to flow through the injection passageway and into the bypass passageway.

22. A system for processing water by mixing the water with an additive, comprising:

a source of unprocessed water;

a destination of processed water;

a source of the additive;

structure defining a main passageway, a bypass passageway, and an injection passageway, where the bypass passageway is in fluid communication with the main passageway at first and second locations and the injection passageway is in fluid communication with an injection portion of the bypass passageway;

a first structure for connecting the source of unprocessed water to the first location of the main passageway;

a second structure for connecting the second location of the main passageway to the destination of processed water;

a third structure for connecting the source of the additive to the injection passageway; and a tap valve assembly arranged in the bypass passageway between the first location of the main passageway and the injection portion of the bypass passageway to selectively allow or prevent the flow of unprocessed water from the bypass passageway to a tap opening; wherein the injection portion of the bypass passageway is configured such that the flow of unprocessed water through the bypass passageway causes additive to flow through the injection passageway and into the bypass passageway; and unprocessed water obtained from the tap opening is mixed with a substance to obtain the additive.

23. A system for processing water by mixing the water with an additive, comprising:

a source of unprocessed water;

a destination of processed water;

a source of the additive;

structure defining a main passageway, a bypass passageway, and an injection passageway, where the bypass passageway is in fluid communication with the main passageway at first and second locations and the injection passageway is in fluid communication with an injection portion of the bypass passageway;

a first structure for connecting the source of unprocessed water to the main passageway;

a second structure for connecting the main passageway to the destination of processed water;

a third structure for connecting the source of the additive to the injection passageway; and a plurality of discs each defining a through hole of a different cross-sectional area, where a selected one of the plurality of discs is arranged in the main passageway between an inlet portion of the main passageway and a mixing portion of the main passageway to create a differential pressure between the inlet portion and the mixing portion; wherein the injection portion of the bypass passageway is configured such that the flow of unprocessed water through the bypass passageway causes additive to flow through the injection passageway and into the bypass passageway.

24. A method of mixing water with an additive, comprising the steps of:

defining a main passageway, a bypass passageway, and an injection passageway;

allowing fluid communication between the bypass passageway and the main passageway at first and second locations;

allowing fluid communication between the injection passageway and an injection portion of the bypass passageway;

connecting the main passageway to a source of unprocessed water;

connecting the main passageway to a destination of processed water;

connecting the injection passageway to the source of the additive;

configuring the injection portion of the bypass passageway such that the flow of unprocessed water through the bypass passageway causes additive to flow through the injection passageway and into the bypass passageway; and creating a desired differential pressure between an inlet portion of the main passageway and a mixing portion of the main passageway by providing a plurality of discs each defining a through hole of a different cross-sectional area;

selecting one of the plurality of discs based on the desired differential pressure; and arranging the selected one of the plurality of discs within the main passageway to create the desired differential pressure.

* * * * *